No. 832,509. PATENTED OCT. 2, 1906.
S. D. SLOCUM.
OUTLET BOX.
APPLICATION FILED SEPT. 18, 1905.
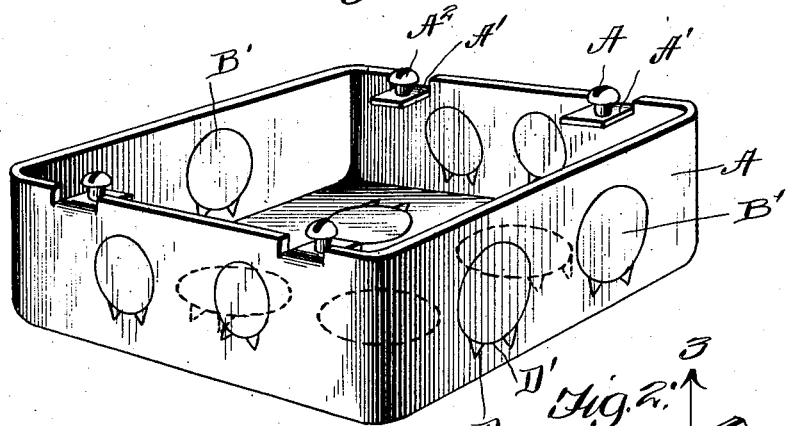
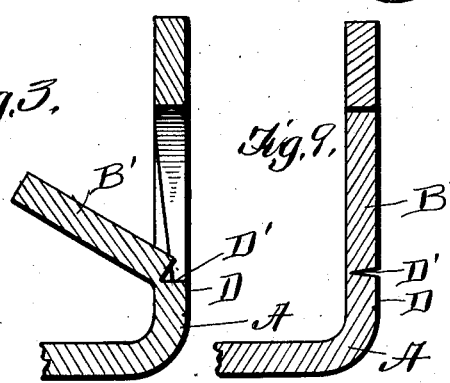 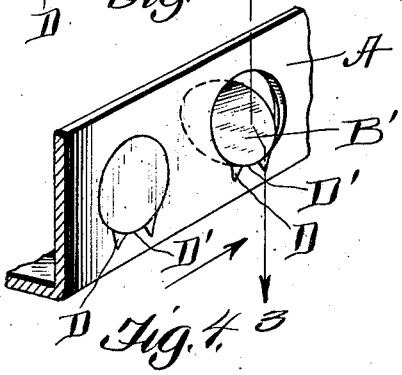
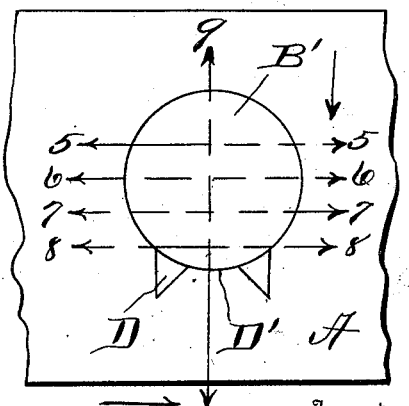
Witnesses
R. W. Boswell
A. L. Hoyt
Inventor
Silas D. Slocum,
By Franklin H. Hough
Attorney

UNITED STATES PATENT OFFICE.

SILAS D. SLOCUM, OF ALEXANDRIA, VIRGINIA, ASSIGNOR TO LEON W. BOSSERT, OF UTICA, NEW YORK.

OUTLET-BOX.

No. 832,509.　　　Specification of Letters Patent.　　　Patented Oct. 2, 1906.

Application filed September 18, 1905. Serial No. 279,027.

*To all whom it may concern:*

Be it known that I, SILAS D. SLOCUM, a citizen of the United States, residing at Alexandria, in the county of Alexandria and State of Virginia, have invented certain new and useful Improvements in Outlet-Boxes; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in outlet or junction boxes for electric conduits, and comprises means whereby the sides and bottom of the box may be provided with removable disks, which may be easily and quickly removed to form apertures through which conduits may be passed; and it consists of a particular mechanical construction of box whereby the disks may be securely held from accidental removal from the box until it is necessary to remove one or more of the disks for the reception of conduits.

Heretofore it has been common in the art to construct outlet-boxes in which partially-formed openings are made in the walls of the box and held in place by means of integral parts, making it necessary when desired to form an opening to the box to cause the disk to be driven out by breaking the integral portions; but it is found very frequently that when openings are partially formed in this manner, especially when the integral parts of the disks are positioned toward the upper marginal edges of the apertures, the walls of the box are quite likely to be distorted by blows which are imparted to the disks with the view of removing the same and which would bring threaded apertures out of registration with apertures in the cover of the box and generally distort the box. It has also been found that where the disks to be removed are partially cut from the walls of the box and expanded against the marginal outlines of the apertures the disks frequently become loosened and fall from the apertures.

To obviate the foregoing objections and generally improve upon and render more efficient this class of inventions, I have found that by causing the disks which are removed from the openings to be severed along diagonal lines, the upper portion of the disk being cut entirely through the wall, while the remaining circumference of the disk is cut diagonally from the upper portion of the disk to a thickness substantially one-half the thickness of the metal at the lower end and having the integral portions of the disk adjacent to the reinforced or angled part of the box intermediate the bottom and the side, the disk may be easily and quickly removed by a blow upon the same without in any way distorting the shape of the box.

My invention is illustrated in the accompanying drawings, in which—

Figure 1 is a perspective view of an outlet-box. Fig. 2 is a detail perspective of a portion of the box, showing one of the disks partially severed from the surrounding wall of the aperture in the wall of the box. Fig. 3 is a sectional view taken on line 3 3 of Fig. 2. Fig. 4 is an elevation of a portion of one side of the box. Fig. 5 is a sectional view on line 5 5 of Fig. 4. Fig. 6 is a sectional view on line 6 6 of Fig. 4. Fig. 7 is a sectional view on line 7 7 of Fig. 4. Fig. 8 is a sectional view on line 8 8 of Fig. 4. Fig. 9 is a sectional view on line 9 9 of Fig. 4.

Reference now being had to the details of the drawings by letter, A designates an outlet-box which is struck up from steel or other suitable metal and is provided with inwardly-turned lips A', which are apertured to receive screws A², whereby a cover (not shown) may be fastened to the box in the usual manner. The side walls and the bottom of the box at different locations are adapted for the reception of conduits by causing circular disk-shaped sections B to be partially severed from the walls of the box, and which may be easily and quickly removed when it is desired to insert a conduit at any particular location. By means of a die having an inclined cutting edge each disk B' is partially severed from the wall of the box, as shown clearly in Fig. 3 of the drawings, in which illustration when the disks are formed in the side walls of the box the upper portion of the disk is entirely free from the side wall of the box and the marginal edge of the disk between the portion which is cut entirely through the wall of the disk and the lowest part of the latter is cut in a diagonal plane, the lowest portion of the disk being substantially severed one-half the thickness of the wall and tapering to the inner wall of the box.

Referring to Figs. 1, 2, and 4 of the drawings, it will be noted that each removable disk or plug has two integral portions intermediate the points designated by letter D in the drawings, and which portions are uncut, the V-shaped marking along the marginal edges of the integral parts being formed by reinforced portions of the die. The portion D' between the two integral parts is nearly cut through the wall of the box, as shown by the sectional view of Fig. 9 of the drawings, thus forming means whereby the disk may be readily severed from the wall of the box by imparting a blow upon the same and not leave a ragged edge upon the lowest marginal portion of the aperture, and upon which a conduit passing through the aperture would naturally rest. Where the disks are formed in the bottom of the box, the integral uncut portions of each disk are disposed adjacent to one of the angles intermediate the bottom and side wall, as illustrated in Fig. 1 of the drawings, and the portion of the disk opposite its integral uncut connections is free from the box and so arranged that the disk in the bottom, as well as in the side, may be removed easily without bending either the bottom or side wall of the box, as will be readily understood. In the removal of the disks which are partially severed in the manner shown in the drawings I have found from experience that the severing of the disk along diagonal lines will relieve the box of strain, and the disk, with the portion intermediate the two integral points D cut nearly through the wall along the circular outline of the disk, will readily break without bending of the wall of the box, as the point where the breakage takes place is reinforced by the angled portion of the box intermediate the bottom and the sides, thus producing an efficient box and one in which the disks are securely held in place against accidental removal until it is desired to remove one or more for the purpose of receiving conduits.

Having thus fully described my invention, what I claim as new, and desire to secure by Letters Patent, is—

1. An outlet-box for electrical conduits, having a series of disk-sections which are partially cut from the bottom and the side walls of the box along diagonal lines, as set forth.

2. An outlet-box for electrical conduits, having a series of disk-sections which are partially cut from the bottom and the side walls of the box along diagonal lines, a portion of each disk being free from the box, as set forth.

3. An outlet-box for electric conduits, having a series of disk-sections, which are partially cut from the walls thereof along diagonal lines, with the upper portions of the disks free from the wall of the box, as set forth.

4. An outlet-box for electric conduits, having a series of disk-sections, which are partially cut from the walls thereof along diagonal lines, with the upper portions of the disks free from the wall of the box, and with integral uncut portions of the disk adjacent to the angle of the box between its side and bottom, as set forth.

5. An outlet-box for electric conduits, having a series of disk-sections, which are partially cut from the walls thereof along diagonal lines, with the upper portions of the disks free from the wall of the box, with integral uncut portions of the disk adjacent to the angle of the box between its side and bottom, the wall of the box intermediate said integral portions being cut partially through, as set forth.

6. An outlet-box for electric conduits, having a series of disk-sections partially cut from the walls thereof along diagonal lines, with the upper portions of the disks cut entirely through the wall and along diagonal lines, with uncut integral portions at the lower portion of the disk adjacent to the angle formed between the bottom and side of the box, the lower part of the diagonal severed part of the disks terminating substantially at the center of the wall, as set forth.

In testimony whereof I hereunto affix my signature in the presence of two witnesses.

SILAS D. SLOCUM.

Witnesses:
A. L. HOUGH,
FRANKLIN H. HOUGH.